United States Patent
Lawrence

(10) Patent No.: US 12,378,080 B2
(45) Date of Patent: Aug. 5, 2025

(54) CONTINUOUS CONVEYOR BELT

(71) Applicant: Lawrence Equipment Inc., South El Monte, CA (US)

(72) Inventor: Eric Clay Lawrence, Hungtington Beach, CA (US)

(73) Assignee: Lawrence Equipment, Inc., South El Monte, CA (US)

( * ) Notice: Subject to any disclaimer, the term of this patent is extended or adjusted under 35 U.S.C. 154(b) by 124 days.

(21) Appl. No.: 18/354,853

(22) Filed: Jul. 19, 2023

(65) Prior Publication Data

US 2024/0025650 A1 Jan. 25, 2024

Related U.S. Application Data

(63) Continuation-in-part of application No. 17/871,184, filed on Jul. 22, 2022, now abandoned.

(51) Int. Cl.
*B65G 15/30* (2006.01)

(52) U.S. Cl.
CPC .................................. *B65G 15/30* (2013.01)

(58) Field of Classification Search
None
See application file for complete search history.

(56) References Cited

U.S. PATENT DOCUMENTS

| | | |
|---|---|---|
| 3,121,660 A | 2/1964 | Hall, Jr. |
| 3,487,871 A | 1/1970 | Kanamori |
| 3,588,994 A | 6/1971 | Parenti |
| 3,877,588 A | 4/1975 | Meisel |
| 4,405,298 A | 9/1983 | Blain |
| 4,540,389 A | 9/1985 | Ramsey |
| 4,548,663 A | 10/1985 | Worcester |
| 4,617,716 A | 10/1986 | Lay et al. |
| 4,966,541 A | 10/1990 | Mistretta |
| 5,180,593 A | 1/1993 | Mistretta et al. |
| 5,231,919 A | 8/1993 | Lawrence et al. |
| 5,259,496 A | 11/1993 | Common |
| 5,298,274 A | 3/1994 | Khalsa |
| 5,339,948 A | 8/1994 | Cox et al. |
| 5,342,250 A | 8/1994 | Sanders |

(Continued)

FOREIGN PATENT DOCUMENTS

| | | |
|---|---|---|
| JP | 4163436 | 10/2008 |
| JP | 2012091933 | 5/2012 |

(Continued)

OTHER PUBLICATIONS

International Search Report and Written Opinion in International Appln. No. PCT/US2023/070590, mailed on Nov. 8, 2023, 10 pages.

(Continued)

*Primary Examiner* — Kavel Singh
(74) *Attorney, Agent, or Firm* — Fish & Richardson P.C.

(57) ABSTRACT

Methods, systems, and apparatus, including computer programs encoded on computer storage media, for using a continuous conveyor belt. One of the systems includes a conveyor belt adapted to move a plurality of comestibles and having i) a first edge, ii) a second edge opposite the first edge, iii) a first row of apertures that is substantially parallel to the first edge, and iv) a second row of apertures that is substantially parallel to the second edge.

20 Claims, 9 Drawing Sheets

(56) References Cited

U.S. PATENT DOCUMENTS

| | | | |
|---|---|---|---|
| 5,402,264 A | 3/1995 | Wilbur et al. | |
| 5,451,189 A | 9/1995 | Carelli et al. | |
| 5,531,316 A | 7/1996 | Savino | |
| 5,576,033 A | 11/1996 | Herrera | |
| 5,580,583 A | 12/1996 | Caridis et al. | |
| 5,688,355 A | 11/1997 | Yu | |
| 5,720,990 A | 2/1998 | Lawrence et al. | |
| 5,921,379 A | 7/1999 | Horton | |
| 5,942,301 A | 8/1999 | Schlueter, Jr. et al. | |
| 6,053,308 A | 4/2000 | Vogrig et al. | |
| 6,311,036 B1 | 10/2001 | Jia et al. | |
| 6,311,595 B1 | 11/2001 | Schlueter, Jr. et al. | |
| 6,316,070 B1 | 11/2001 | Yu et al. | |
| 6,345,925 B1 | 2/2002 | Coleman | |
| 7,048,622 B2 * | 5/2006 | Shefet | B65G 47/763 |
| | | | 452/32 |
| RE41,573 E | 8/2010 | Sanchez et al. | |
| 7,776,187 B2 | 8/2010 | Spence et al. | |
| 7,828,136 B2 | 11/2010 | Damkjaer | |
| 7,887,314 B2 | 2/2011 | Ruhe et al. | |
| 8,186,986 B2 | 5/2012 | Schöttler et al. | |
| 8,815,057 B2 * | 8/2014 | Eberhardt | D21F 1/0063 |
| | | | 162/903 |
| 9,439,441 B1 | 9/2016 | Rodrigues | |
| 10,080,369 B2 | 9/2018 | Lothe et al. | |
| 2003/0144103 A1 | 7/2003 | Battat et al. | |
| 2004/0033856 A1 | 2/2004 | Levine | |
| 2004/0220005 A1 | 11/2004 | McGrath | |
| 2012/0225151 A1 | 9/2012 | Ruhe et al. | |
| 2013/0153167 A1 | 6/2013 | Eberhardt et al. | |
| 2019/0270592 A1 | 9/2019 | Legresy | |

FOREIGN PATENT DOCUMENTS

| | | |
|---|---|---|
| WO | WO 1993020715 | 10/1999 |
| WO | WO 2004065269 | 8/2004 |
| WO | WO 2017147574 | 8/2017 |

OTHER PUBLICATIONS

ConveyorBelting.net [online], "Conveyor Belting," accessed on Oct. 26, 2018, retrieved from URL <https://www.conveyorbelting.net/>, 15 pages.

* cited by examiner

CONTINUOUS CONVEYOR BELT

CROSS-REFERENCE TO RELATED APPLICATION

This application is a continuation in part of U.S. application Ser. No. 17/871,184, filed Jul. 22, 2022, the contents of which are incorporated by reference herein.

BACKGROUND

Examples of comestible products are flatbreads, which include, for example, tortillas, pita bread, pizza crusts, chapati, and naan. Flatbreads can be made by hand or with automated equipment. For example, a factory can produce one or more types of flatbread. Factories can use partially or fully automated systems to produce flatbread. Automated methods to form flatbread can include, for example, die cutting, sheeting, and pressing of flatbread dough.

Factories can include different types of tools or equipment for the different stages in the production process, such as a mixer, a sheeter or forming press, and an oven. Some production lines have tools to form flatbread dough into a ball and other tools to flatten the dough for baking. The flattened dough can have a circular shape and a specific thickness so the flatbread will have a desired thickness after baking.

SUMMARY

In general, one aspect of the subject matter described in this specification can be embodied in systems that include a conveyor belt adapted to move a plurality of comestibles and having i) a first edge, ii) a second edge opposite the first edge, iii) a first row of apertures that is substantially parallel to the first edge, and iv) a second row of apertures that is substantially parallel to the second edge.

In general, one aspect of the subject matter described in this specification can be embodied in methods that include the actions of aligning a first row of apertures at a first end of a conveyor belt with a second row of apertures at a send end of the conveyor belt, the conveyor belt including i) a first end portion that includes a) the first row of apertures, b) a first plurality of regions that each surround a corresponding aperture from the first row of apertures, and c) a second plurality of regions between sequential regions from the first plurality of regions and ii) a second end portion that includes a) the second row of apertures, b) a third plurality of regions that each surround a corresponding aperture from the second row of apertures, and c) a fourth plurality of regions between sequential regions from the third plurality of regions; welding corresponding regions from the second plurality of regions and the fourth plurality of regions; welding the first end portion of the conveyor belt with the second end portion of the conveyor belt.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the conveyor belt can include: a third row of apertures that is a) substantially parallel to the first edge, and b) within a threshold distance from the first row of apertures; and a fourth row of apertures that is a) substantially parallel to the second edge, and b) within the threshold distance from the second row of apertures. The system can include a splice piece having a first end and a second end. A first threshold portion of a first end adjacent to the first edge can overlap and be welded to the first end of the splice piece. A second threshold portion of a second end adjacent to the second edge can overlap and be welded to the second end of the splice piece. The first threshold portion can be substantially the same size as the second threshold portion.

In some implementations, the first row of apertures can be a threshold distance from the first edge. The second row of apertures can be the threshold distance from the second edge. A first threshold portion of a first end adjacent to the first edge can overlap and be welded to a second threshold portion of a second end adjacent to the second edge. The first threshold portion can be substantially the same size as the second threshold portion. A size of the first threshold portion and the second threshold portion can be between ¼ inches and 4 inches.

In some implementations, a first threshold portion of a first end adjacent to the first edge can overlap and be attached to a second threshold portion of a second end adjacent to the second edge with a heating process between 400 to 1000° F. The conveyor belt can include only two rows of apertures including the first row of apertures and the second row of apertures.

In some implementations, the conveyor belt can include an outer surface adapted to support the plurality of comestibles on portions of the outer surface other than a threshold portion of a first end adjacent to the first edge and the threshold portion of a second end adjacent to the second edge. The system can include a support frame connected to and supporting the conveyor belt. The system can include a press that processes the plurality of comestibles while the plurality of comestibles are on the portions of the outer surface other than the threshold portion of the first end adjacent to the first edge and the threshold portion of the second end adjacent to the second edge. The system can include a loader connected to the support frame and adapted to place the plurality of comestibles on the outer surface of the conveyor belt. The system can include a second conveyor belt adapted to receive at least some of the plurality of comestibles from the conveyor belt after the conveyor belt receives the plurality of comestibles from the loader and moves the at least some of the plurality of comestibles in a longitudinal direction. The system can include a wire connected to the support frame at an end of the support frame within a threshold distance from the second conveyor belt and adapted to remove comestibles from the second conveyor belt for transport onto the second conveyor belt.

In some implementations, the system can include a support frame connected to and supporting the conveyor belt. The system can include a wire connected to the support frame and adapted to remove comestibles from the conveyor belt. The wire can be between $2/1000$ of an inch and ½ inch from the conveyor belt.

In some implementations, the conveyor belt can be manufactured from at least one of silicon, fiberglass, or Teflon.

The conveyor belt can have a width of at least fifty-two inches. The conveyor belt can have a thickness between 2 and 20 mils.

In some implementations, the plurality of comestibles can be a plurality of flatbread pieces.

In some implementations, welding the first end portion of the conveyor belt with the second end portion of the conveyor belt can include (i) welding corresponding regions from the first plurality of regions and the third plurality of regions and (i) welding corresponding regions from the second plurality of regions and the fourth plurality of regions. Welding the first end portion of the conveyor belt with the second end portion of the conveyor belt can include (i) welding corresponding regions from the first plurality of regions and the third plurality of regions and (i) substantially maintaining the weld between the corresponding regions from the second plurality of regions and the fourth plurality of regions.

In some implementations, aligning the first row of apertures and the second row of apertures can include: placing corresponding pins from a plurality of pins through corresponding first apertures from the first row of apertures; and placing the corresponding pins from the plurality of pins through corresponding second apertures from the second row of apertures to align apertures from the first row of apertures with corresponding apertures from the second row of apertures. The method can include removing the plurality of pins from the first row of apertures and the second row of apertures after welding corresponding regions from the first plurality of regions and the second plurality of regions; and after removing the first row of apertures and the second row of apertures from the plurality of pins, maintaining the alignment of the first row of apertures and the second row of apertures with a forming tool while welding the first end portion of the conveyor belt with the second end portion of the conveyor belt.

In some implementations, the method can include after welding the first end portion of the conveyor belt with the second end portion of the conveyor belt, conveying, using the conveyor belt, a plurality of comestibles.

In some implementations, the method can include cutting the conveyor belt through the first row of apertures and the second row of apertures; aligning a third row of apertures at the first end of the conveyor belt with a fourth row of apertures at a first end of a splice piece adjacent to the conveyor belt, the conveyor belt and the splice piece comprising a fifth plurality of regions that each surround corresponding pairs of apertures from the third row of apertures and the fourth row of apertures and a sixth plurality of regions that are each between sequential regions from the fifth plurality of regions; aligning a fifth row of apertures at the send end of the conveyor belt with a sixth row of apertures at a second end of the splice piece, the conveyor belt and the splice piece comprising a seventh plurality of regions that each surround corresponding pairs of apertures from the fifth row of apertures and the sixth row of apertures and an eighth plurality of regions that are each between sequential regions from the seventh plurality of regions; welding corresponding regions from the sixth plurality of regions in the first ends of the conveyor belt and the splice piece; and welding corresponding regions from the eighth plurality of regions in the second ends of the conveyor belt and the splice piece. The method can include positioning the splice piece adjacent to the first end and the second end of the conveyor belt.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
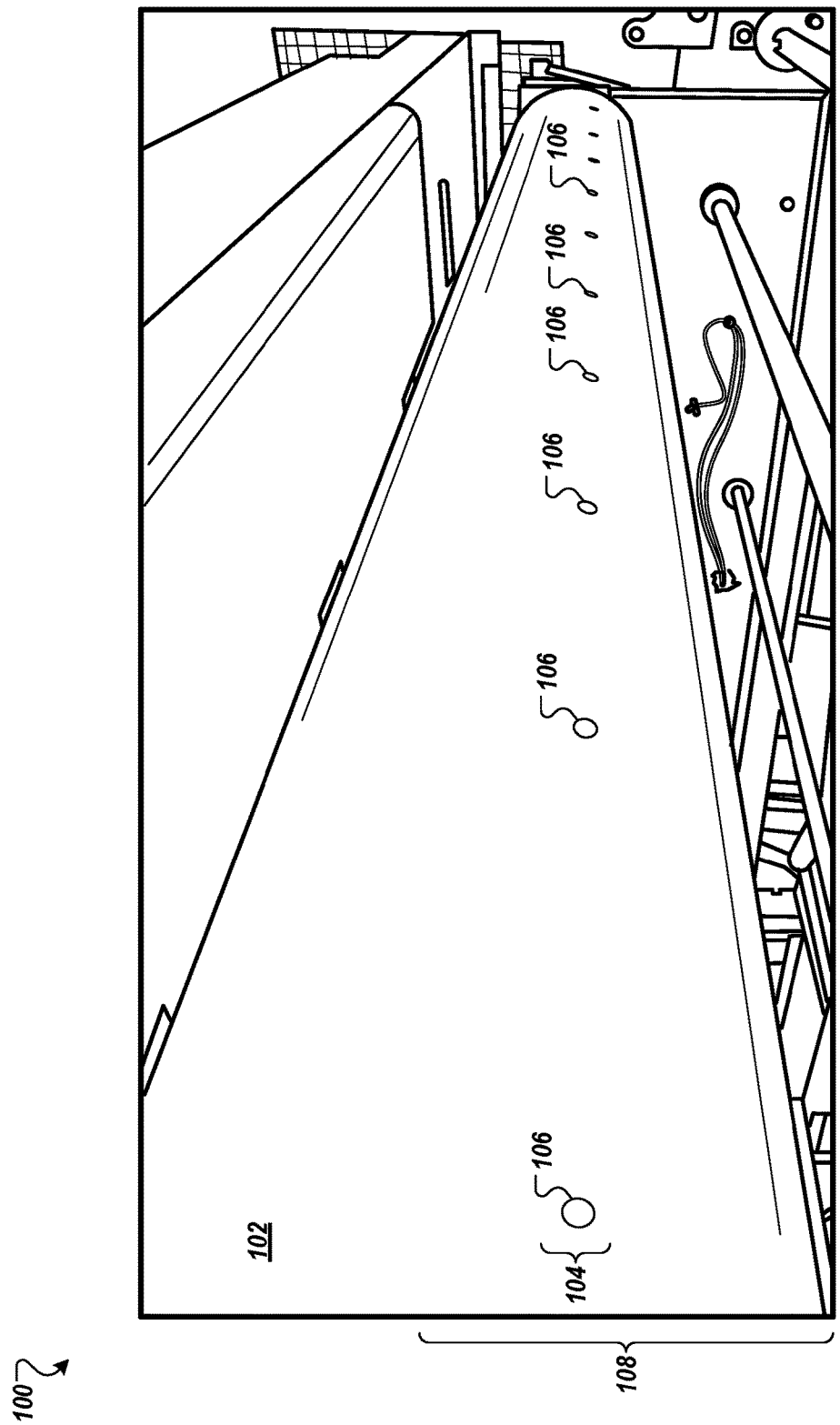
FIG. 1 depicts an example environment that includes a conveyor belt.

Comestible processing systems can include conveyor belts to transfer comestibles between various tools in the comestible processing system. When forming a conveyor belt, a forming tool might try to square up the ends of the conveyor belt to improve tracking of the belt as the belt moves across supporting rollers. If the ends of the conveyor belt are not square within a threshold amount, e.g., not square enough, the conveyor belt does not track correctly and products on the belt might be transferred incorrectly, the conveyor belt might wear unevenly, or both. For instance, a comestible product near a longitudinal edge of a conveyor belt that isn't tracking correctly might fall off the longitudinal edge, run into a surface adjacent to the longitudinal edge, or, when transferring off of the conveyor belt, not align with a processing position on a downstream tool after the conveyor belt.

To better align the ends of a conveyor belt, a conveyor belt can include two rows of apertures. Each of the rows of apertures can be substantially parallel to the corresponding edge of the conveyor belt. A forming tool can insert pins into corresponding apertures from a first row and a second row to connect, e.g., weld, the two ends together. While the pins are inserted into corresponding apertures, the forming tool can connect regions between the pins, e.g., so as to not damage the pins. After connecting the regions between the pins, the forming tool can remove the pins and perform a second connection, e.g., welding, process to connect other corresponding regions that are adjacent to the apertures and were not connected during the first connection process. By using the rows of apertures, the forming tool can more accurately square the ends of the conveyor belt during the connection process, create a conveyor belt that more accurately tracks when moving across supporting rollers, or both.

When conveying comestibles, the conveyor belt can be part of a system that includes a wire adapted to remove comestibles from the conveyor belt. For instance, a pressing system can press comestibles while the comestibles are positioned on the conveyor belt, e.g., portions of the conveyor belt that are more than a threshold distance from the apertures and the regions of the conveyor belt that are connected. After pressing, the conveyor belt can transfer at least some of the comestibles to a downstream component, e.g., can transfer the correctly formed comestibles.

When the comestibles are "tender", e.g., and have a viscoelastic property or an adhesive property that do not satisfy corresponding thresholds, the comestibles are more likely to break during the transfer process from the conveyor belt to the downstream component. For instance, gluten free comestibles can have a viscoelastic property that does not satisfy a viscoelastic threshold, an adhesive property that does not satisfy an adhesive threshold, or both.

To enable the conveyor belt, and the comestible processing system, to transfer tender comestibles, such as gluten free comestibles, the comestible processing system can use a wire adapted to remove the comestibles from the conveyor belt. The comestible processing system can include a support frame connected to the rollers on which the conveyor belt rests. The wire can be placed at least a threshold distance from the end of the support frame near which the comestibles are transferred from the conveyor belt to a downstream component. The wire can be a threshold distance from the conveyor belt. The threshold distance can be selected to increase a likelihood that comestibles removed from the conveyor belt are not damaged during the removal process.

In some implementations, by using the wire with the conveyor belt, the comestible processing system can increase a comestible processing rate. For example, when processing comestibles, the comestible processing system can move a conveyor belt at a speed sufficient to likely remove a comestible from the conveyor belt while also not likely damaging the comestible. Since slower speeds are necessary to reduce a likelihood of damaging a comestible, especially a tender comestible, the comestible processing system uses slower processing rates. By using a wire adapted to remove comestibles from the conveyor belt, the comestible processing system can have an increased comestible processing rate with substantially the same likelihood that comestibles will be damaged during transfer from the conveyor belt.

FIG. 1 depicts an example environment 100 that includes a conveyor belt 102. The conveyor belt 102 can be a lace-less conveyor belt in that the ends of the conveyor belt 102 are connected without the use of lace, e.g., Kevlar lace, or glue. Instead, the conveyor belt can be manufactured using a welding process as described in more detail below.

The conveyor belt 102 includes two rows 104 of apertures 106, each of which can be within a threshold distance of a corresponding latitudinal edge of the conveyor belt 102. As shown in FIG. 1, the two latitudinal edges of the conveyor belt 102 are connected, and the two rows 104 of apertures 106 are stacked on top of each other.

After the two latitudinal edges of the conveyor belt 102 are connected, the apertures can be left unfilled, e.g., other than any filling that might occur during the welding process. For example, if the apertures were filled, the filling might fall out, in part or in whole, during comestible transfer. To reduce a likelihood of contaminating transferred comestibles with any filling, the apertures can remain unfilled.

The conveyor belt 102 can be manufactured from any appropriate material for use transferring comestibles, e.g., flatbread whether baked or unbaked. For instance, the conveyor belt 102 can be manufactured from Teflon, fiberglass, silicon, or a combination of two or more of these.

The conveyor belt 102 can have a thickness between 2 to 20 mils, preferably between 5 to 12 mils, preferably 6.5 mils. Because a region 108 in which the two latitudinal ends of the conveyor belt 102 are connected, and that includes the two rows 104 of apertures 106, includes both latitudinal ends of the conveyor belt 102, the region 108 has a thickness that is greater than a thickness of the rest of the conveyor belt 102 when the ends of the conveyor belt 102 that form the region are not thinner than the rest of the conveyor belt 102. For instance, the region 108 can have a thickness between 4 to 40 mils when the other regions of the conveyor belt 102 have a thickness between 2 to 20 mils. In some examples, the region 108 can have a thickness between 10 to 24 mils, or a thickness of 13 mil.

Each of the ends of the conveyor belt 102 adjacent to the latitudinal edges can have a substantially consistent thickness. For instance, each of the latitudinal ends is not tapered.

In some examples, one or both of the ends of the conveyor belt 102 adjacent to the latitudinal edges can have a thickness different than the thickness of the rest of, e.g., a middle portion of, the conveyor belt 102. One or both of the latitudinal ends can be tapered. For instance, both edges can be tapered to reduce a thickness of the region 108 when the two ends are connected. In some examples, one or both of the latitudinal ends can thicken compared to the thickness of a middle portion of the conveyor belt.

The region 108 can be formed of the two latitudinal ends of the conveyor belt 102. The ends can have a threshold portion over which the two ends overlap. The threshold portion can have a length between ¼ to 4 inches.

A location of the rows 104 of apertures 106 can be selected using a thickness of the ends of the conveyor belt 102 adjacent to the latitudinal edges, a material from which the conveyor belt 102 is manufactured, a diameter of the apertures, or a combination of two or more of these. For instance, the rows 104 of apertures 106 can be further from the latitudinal edges when the ends are tapered than if the ends have substantially consistent thicknesses, e.g., are not tapered.

The conveyor belt 102 can be adapted to convey comestibles, e.g., dough, pressed dough, or other types of flatbread during any processing stage. For instance, the conveyor belt 102 can convey comestibles from a flatbread press to an oven, described below in more detail.

Since the region 108 has the row 104 of apertures 106, a comestible processing system that includes the conveyor belt 102 might not use the region 108 to transfer comestibles. For instance, if the comestible processing system were to use the region 108 to transfer comestibles, those comestibles might have a higher likelihood of becoming damaged. This can occur during a press process when a comestible positioned on the conveyor belt 102 is pressed, which can transfer any imperfections or shapes from the conveyor belt 102 onto the comestible, such as an aperture or another shape created by connecting the overlapping ends of the conveyor belt.

In some implementations, the conveyor belt 102 can include one or more alignment markers (not shown). One example of alignment markers can include metal tabs. The comestible processing system can use the alignment markers when processing comestibles, e.g., to reduce a likelihood that comestibles are placed in the region 108. For instance, the conveyor belt 102 can include alignment markers before and after the region 108. The comestible processing system, e.g., a comestible press, can use a sensor to detect the alignment markers. If the detection of the alignment markers indicates that the region 108 is positioned to receive a comestible, the comestible processing system can move the conveyor belt 102 so that the region 108 is no longer positioned to receive comestibles.

By using the rows 104 of apertures 106 during the welding process, the conveyor belt 102 can be thinner than belts used in prior systems. For instance, comestible belts in prior systems can have a thickness around 26 mils, compared to the 2 to 20 mils for the conveyor belt 102. Further, prior systems can be combined using a lace that has a thickness of 9.5 mils, adding to the thickness of a region in which two ends of the belt are connected.

By having a thinner thickness, the conveyor belt 102 can improve comestible processing. For instance, when a component that includes the conveyor belt 102 changes a temperature of the conveyor belt 102, e.g., either by heating the conveyor belt 102 or cooling the conveyor belt 102, as part of comestible processing, the component can more quickly change the temperature of the conveyor belt 102 when the conveyor belt 102 is thinner than the conveyor belt would otherwise be. By more quickly changing temperature, the conveyor belt 102 can improve a shaping process of a carried comestible, a quality of a carried comestible, a production speed for carried comestibles, or a combination of these. For instance, when the conveyor belt 102 is part of a comestible press, pressed comestibles are more likely to maintain their pressed shape when the conveyor belt 102 is thinner and has better heat conductance.

In some implementations, the rows 104 of apertures 106 can be substantially parallel to the corresponding latitudinal edges closest to the corresponding row 104. This can enable a forming tool to align the corresponding apertures onto corresponding pins with a substantially even pressure on each of the apertures. The substantially even pressure can reduce a likelihood that a corresponding aperture will break, increase a likelihood that the two ends are squared correctly, or both.

For example, if some of the apertures 106 in a row 104 were different distances from the corresponding latitudinal edge, an alignment process of the two ends can create tension, put a different amount of pressure on walls surrounding different ones of the apertures, e.g., walls surrounding apertures closer to a latitudinal edge can have more pressure than walls surrounding apertures further from the latitudinal edge, or both. By having the rows 104 of apertures 106 substantially parallel to a corresponding latitudinal edge, e.g., such that the apertures 106 in a row 104 are all substantially the same distance from the corresponding latitudinal edge, the conveyor belt 102 can reduce tension during the process connecting the two ends in the region 108, can reduce any pressure differences on the walls surrounding the apertures in a row 104, or both.

In some implementations, the rows 104 of apertures 106 can each have three or more apertures. By having three or more apertures, there can be a reduced likelihood that the region 108 will have wrinkles when the two ends are connected. Wrinkles can reduce processing performance of the conveyor belt 102 in transporting comestibles. For instance, wrinkles can cause tracking problems in the movement of the conveyor belt 102, e.g., as part of the comestible processing system. Tracking problems can reduce a speed at which the conveyor belt 102 can move, reducing output of the comestible processing system that includes the conveyor belt.

The number of apertures 106 in a row 104 can be selected using a size, e.g., diameter, of the apertures, a width of the conveyor belt 102, a material from which the conveyor belt 102 is manufactured, a quantity of comestibles that the conveyor belt 102 will transfer at a time, e.g., either in a row 104 or in a processing grid layout, or a combination of two or more of these. For instance, to reduce a likelihood of wrinkles, a configuration system can select the number of apertures for the rows 104 of apertures 106 using one or more of the above mentioned parameters. The apertures 106 can have diameters between ¼ of an inch to 1 inch.

The region 108 in which the two ends of the conveyor belt 102 overlap can be any appropriate length. A system can select a size for the length using a property of the material from which the conveyor belt 102 is manufactured, e.g., a tensile strength, a thickness of the conveyor belt 102, a width of the conveyor belt 102, or a combination of two or more of these.

The conveyor belt 102 can have any appropriate width. For instance, the width can be at least 52 inches, e.g., 52 inches or 60 inches. As the width of the conveyor belt 102 gets larger, any inaccuracies in the conveyor belt's 102 tracking are more pronounced. For example, a conveyor belt with a 30 inch width and a tracking inaccuracy can correctly transfer comestibles for a duration of time but a conveyor belt with a 60 inch width and the same tracking inaccuracy likely would be unable to operate for the same duration of time without breaking.

The conveyor belt 102 has two latitudinal edges. Each of the latitudinal edges can be substantially straight.

The conveyor belt 102 can be connected to a support frame. For instance, the conveyor belt 102 can connect with one or more rollers. Each of the rollers can be mounted onto the support frame. Some of the rollers can be passive. Some of the rollers can be powered to rotate, e.g., by an actuator.

In some implementations, the support frame or another component in the comestible processing system can include a forming tool, described in more detail below. The forming tool can connect the two ends of the conveyor belt 102. The forming tool can include a row of pins. The support frame can position the two rows 104 of apertures 106 so that the apertures 106 substantially align with the row of pins. For instance, each of the pins in the row of pins aligns with a corresponding aperture from each of the rows 104 of apertures 106, e.g., aligns with two apertures, one from the first row 104 and another from the second row 104.

When the two rows 104 of apertures 106 are substantially aligned with the row of pins, the forming tool can extend the pins into the apertures. By extending the pins into the apertures, the forming tool can substantially square the two ends of the conveyor belt 102.

While the pins are extended into the apertures, the forming tool can connect the two ends of the conveyor belt 102 as described in more detail below. For instance, the forming tool can weld the two ends together.

When the connection process is complete, the forming tool can retract the pins from the apertures. The forming tool can maintain the pins in the retracted position while the comestible processing system processes comestibles using the conveyor belt 102. For instance, when the support frame is a support frame for a comestible press, the forming tool can maintain the pins in the retracted position while the conveyor belt 102 receives comestible balls, a comestible press presses the comestible balls, and the conveyor belt 102 transfers the pressed comestibles to a downstream component.

The conveyor belt 102 can be included in any appropriate component in a comestible processing system. For example, the conveyor belt 102 can be part of a comestible press, a monitoring station, a counter-stacker, or a separate conveyor that transfers comestibles between other components.

Figure 2:
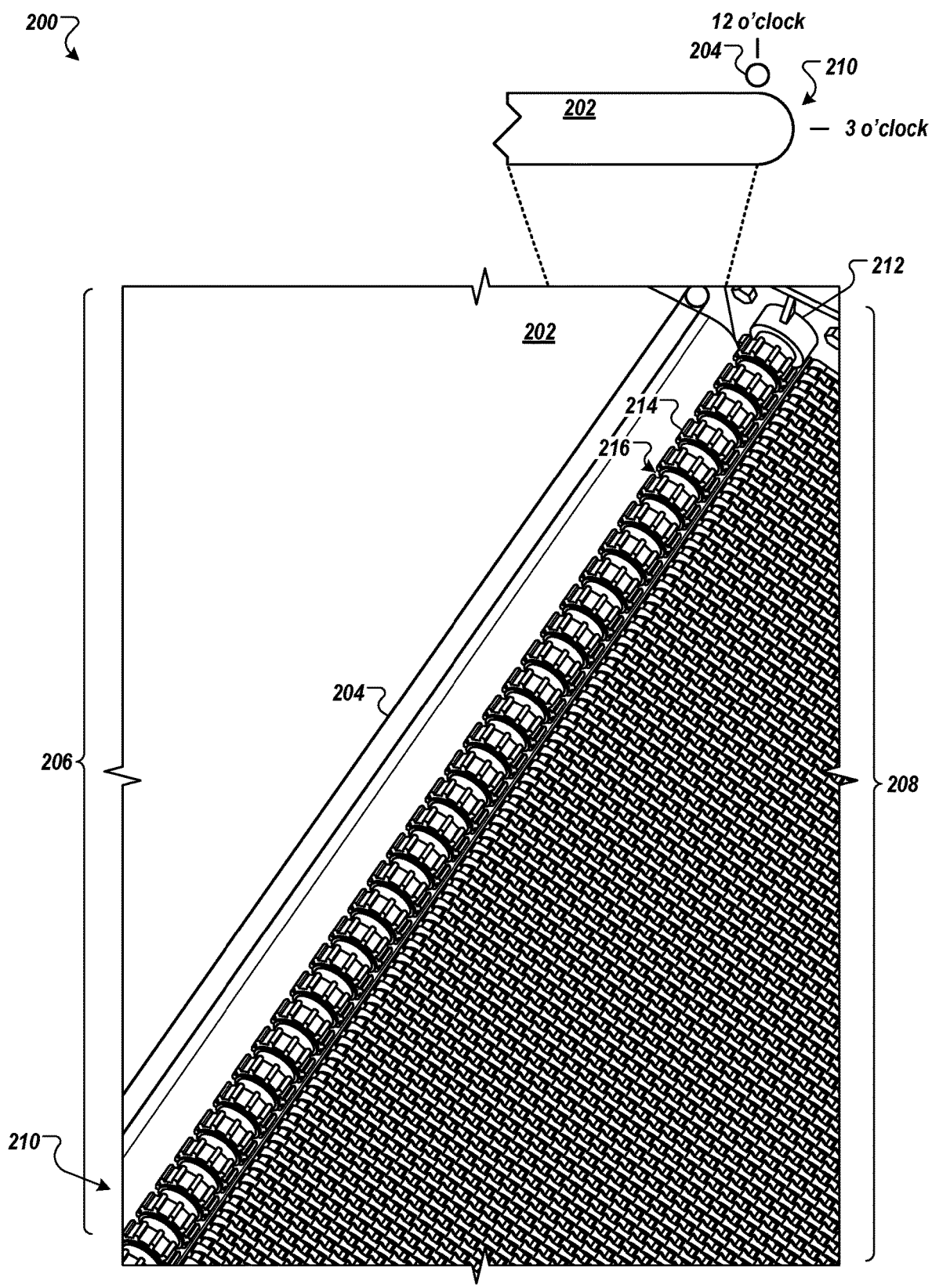
FIG. 2 depicts an example system that includes a conveyor belt and a wire.

FIG. 2 depicts an example system 200 that includes a conveyor belt 202 and a wire 204. The conveyor belt 202 can be the conveyor belt 102 described above with reference to FIG. 1. The system 200 can use the wire 204 to remove comestibles from the conveyor belt 202.

For example, the system 200 can use the conveyor belt 202 to transfer comestibles from a first component 206 to a downstream component 208. In this example, the downstream component 208 is another conveyor. When the first component 206 is a comestible press, the downstream component 208 can be the other conveyor used to transfer comestibles from the comestible press to an oven.

The system 200 can use the wire 204 to remove comestibles from the conveyor belt 202. For instance, comestibles might stick to the conveyor belt 202 without the use of the wire 204. By using the wire 204, the system 200 can reduce a likelihood that comestibles will stick to the conveyor belt 202 when the comestibles are being transferred to the downstream component 208.

The wire 204 can be any appropriate distance from the conveyor belt 202. For instance, the wire 204 can be between 2/1000 of an inch and ½ an inch from the outer surface of the conveyor belt 202. In some examples, the wire 204 is about 3/16 of an inch from the outer surface of the conveyor belt 202.

The wire 204 can have a thickness between 10 to 50 mils. For instance, the wire 204 can have a thickness between 10 and 32 mils, preferably 20 mils.

The wire 204 can be positioned toward a discharge end 210 of the conveyor belt 202. The wire 204 can be at any appropriate position with respect to the discharge end 210 of the conveyor belt 202. For instance, the wire 204 can be between 11:55 o'clock and 3 o'clock, or 12 o'clock and 3 o'clock with respect to the discharge end 210. In some examples, the wire 204 is between 11:55 o'clock and 1 o'clock, or 12 o'clock and 1 o'clock, e.g., 12:30. In some examples, the wire 204 can be within a threshold distance below 12 o'clock that is closer to 12 o'clock than 1 o'clock, e.g., between 12 and 12:05 o'clock, or between 11:55 and 12 o'clock.

A configuration system can select the position of the wire 204, a distance of the wire 204 from an outer surface of the conveyor belt 202, or both, using any appropriate parameter. For instance, the configuration system can select the position of the wire 204, the distance of the wire 204 from the outer surface of the conveyor belt 202, or both, using a geometry of the conveyor belt 202, e.g., when installed in a support frame or another component in a comestible processing system; a geometric of a the downstream component 208 to which comestibles are transferred; a predicted inertia of a comestible transported by the conveyor belt 202; properties of the comestible such as a viscosity of the comestible; properties of the material from which the conveyor belt 202 is manufactured; or a combination of two or more of these.

In some implementations, the system 200 can include a roller 212. The roller 212 can be adapted to move comestibles from the conveyor belt 202 to the downstream component 208. For example, the roller 212 can guide comestibles from the conveyor belt 202 onto the downstream component 208 using one or more flappers 214.

In some implementations, the system 200 can use one or more blowers (not shown) to blow air onto bottoms of at least some comestibles when the comestibles are transferred from the conveyor belt 202 to the downstream component 208. The blowers can blow a stream of air upward toward the bottoms of comestibles to reduce a likelihood that the comestibles will land complete on the roller 212. The blowers can blow a continuous stream of air, intermittently blow air, or a combination of both.

The roller 212 can include one or more apertures 216 through which the blowers blow air. For instance, the roller 212 and the blowers can be connected to the support frame. The blowers can be positioned below the roller 212. In some examples, the system 200 can include one blower below each of the apertures 216 in the roller.

In some implementations, the system 200 does not include a cantilevered head frame onto which the conveyor belt 202 is placed. For instance, when the first component 206 is a comestible press, given the weight of the press head, the conveyor belt 202 is placed on a support frame that does not include a cantilevered head. This is done so that the support frame can support the weight of the press head.

Figure 3A:
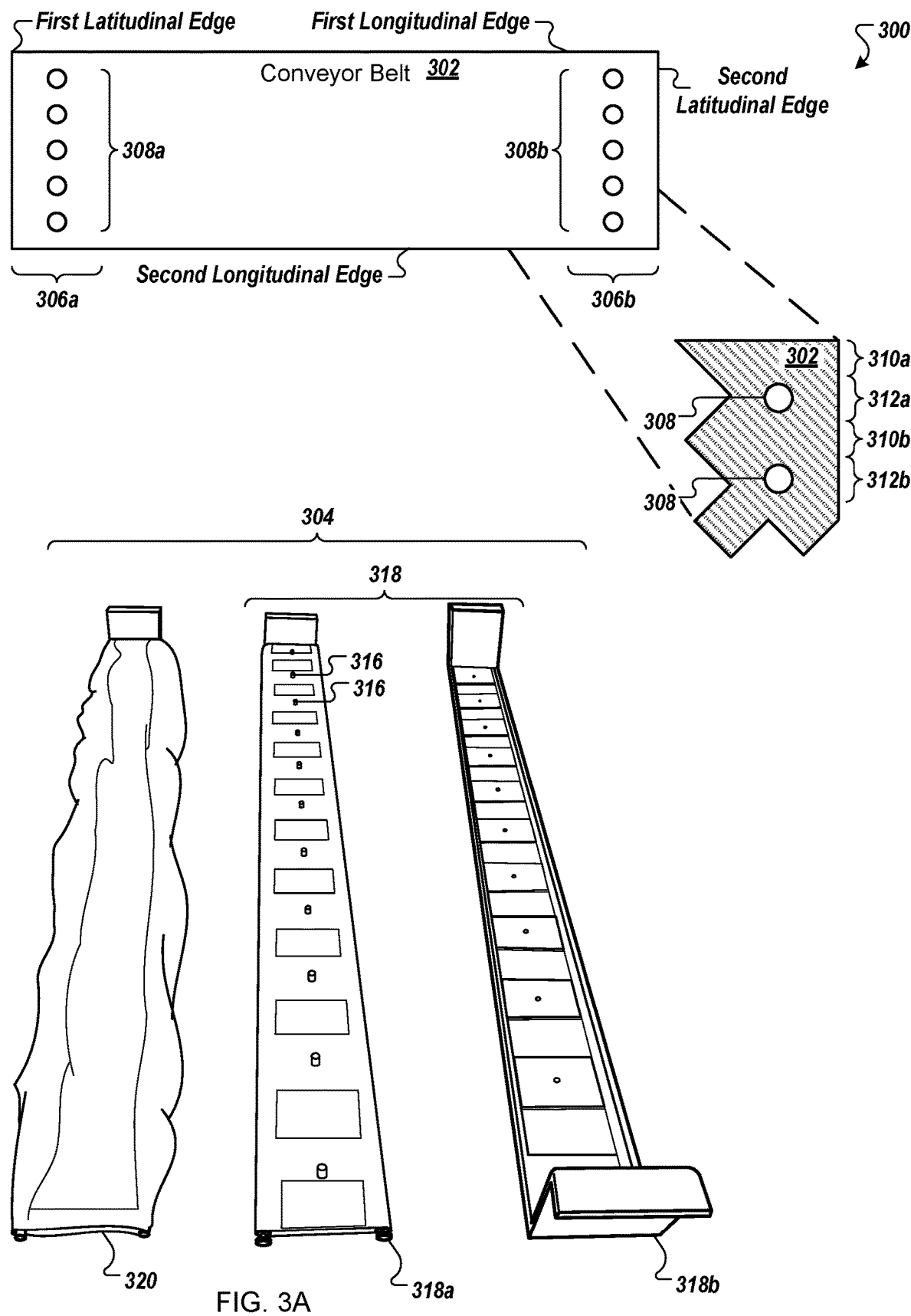
FIGS. 3A-C depict an example environment with a discontinuous conveyor belt and a forming tool.
Figure 3B:
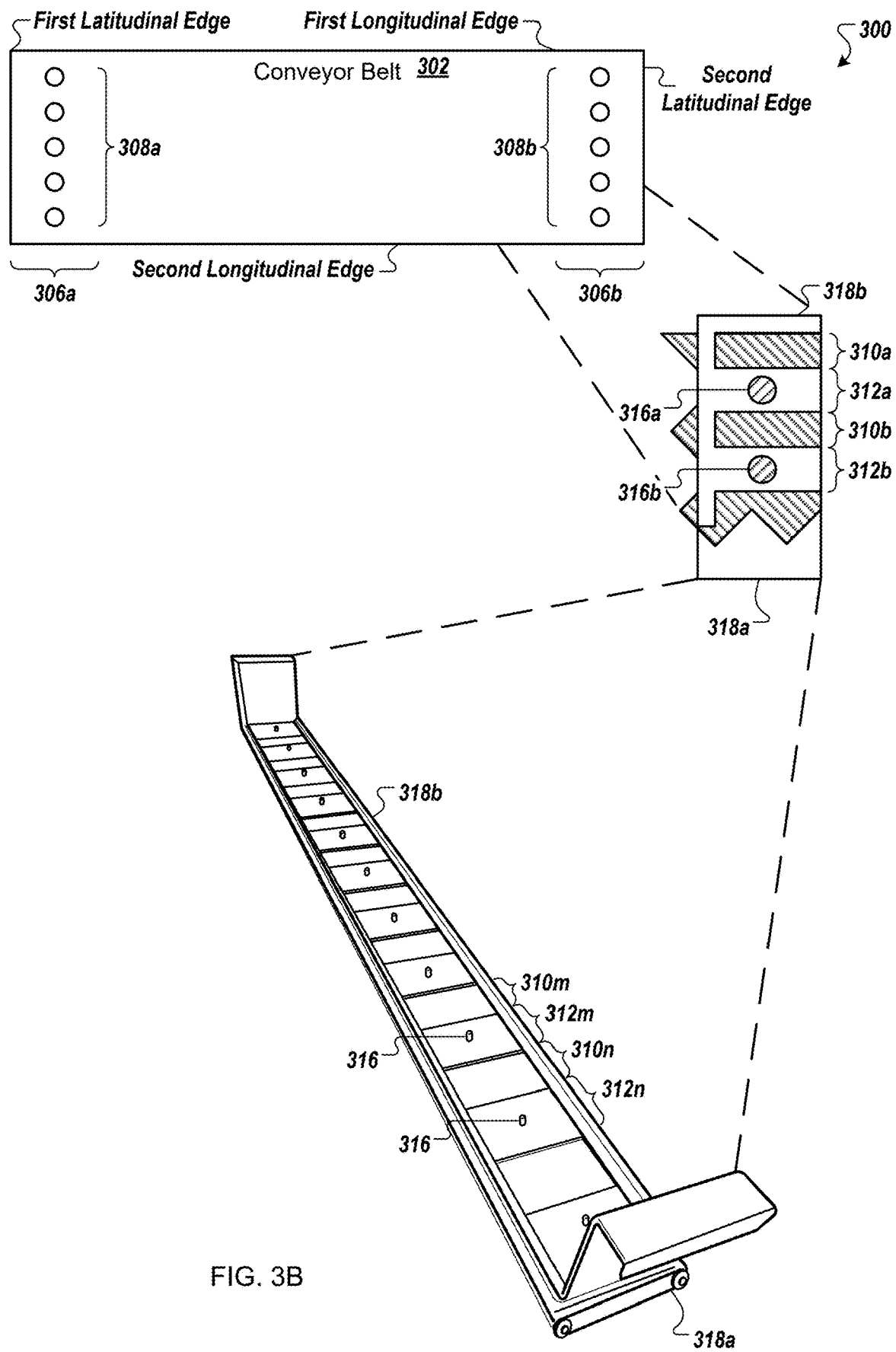
Figure 3C:
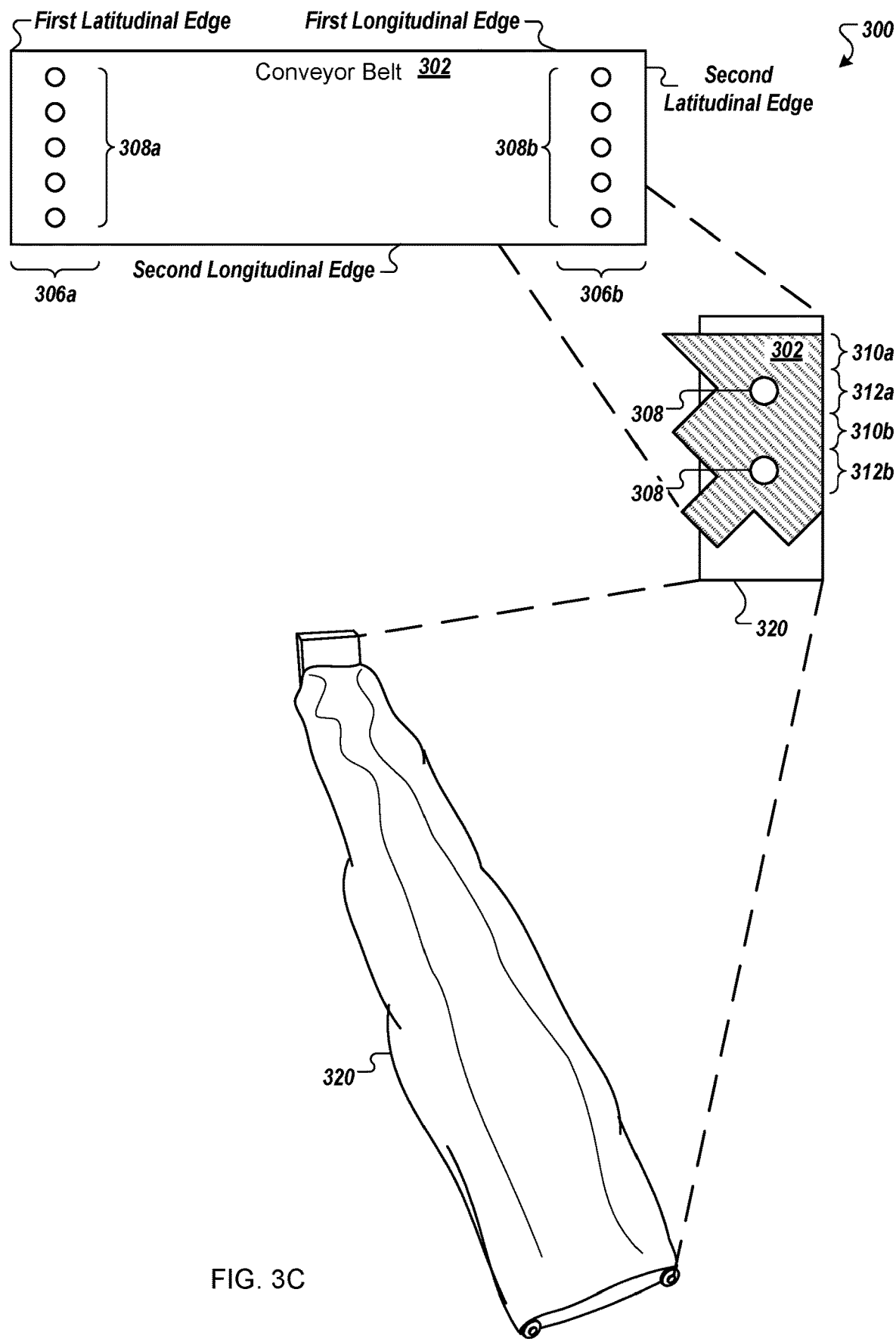

FIGS. 3A-C depict an example environment 300 with a discontinuous conveyor belt 302 and a forming tool 304. A comestible processing system can use the forming tool 304 to connect two ends 306a-b of the discontinuous conveyor belt 302, that includes rows of apertures 308a-b, to form a continuous conveyor belt, e.g., the conveyor belt 102 or 202. For instance, a comestible press can include the forming tool 304 to create continuous conveyor belts.

In some examples, the forming tool 304 includes an alignment subcomponent 318 and a welding platform 320. The alignment subcomponent 318 can include a guide 318a and a securing bracket 318b.

During the continuous conveyor belt forming process, the forming tool 304 can receive the two ends 306a-b of the conveyor belt 302. The forming tool 304 can place the rows of apertures 308a-b over pins 316a-b included in the alignment subcomponent 318, as shown in FIG. 3B. For instance, the forming tool can align a first row of apertures 308a with a second row of aperture 308b. This alignment process can include placing corresponding pins 316a-b included in the guide 318a through the corresponding apertures 308 from the two rows of apertures 308a-b. As depicted in the top right corner of FIG. 3B, the guide 318a is below the conveyor belt 302, e.g., below the two ends 306a-b.

The pins 316a-b can have a diameter selected to fit into the corresponding apertures 308. For instance, when the apertures 308 have a diameter between ¼ of an inch to an inch, the pins 316a-b can have substantially the same diameter selected from between ¼ of an inch to an inch. The diameters of the pins 316a-b can be selected to that the pins 316a-b fit tightly in the apertures 308, e.g., reducing a likelihood that the pins 316a-b will move when placed inside corresponding apertures 308.

The ends of the pins 316a-b that pass through the apertures 308 can be manufactured to enable to pins 316a-b to be easily inserted into the apertures 308 before the pins fit tightly in the apertures 308. For instance, the ends of the pins 316a-b can be rounded, pointed, or have another appropriate shape.

The forming tool 304 can place the securing bracket 318b on top of the two ends 306a-b of the conveyor belt 302. This can form a stack that includes the guide 318a at the bottom, the two ends 306a-b of the conveyor belt 302 in the middle, e.g., in either order, and the securing bracket 318b on the top.

Placement of the securing bracket 318b on top of the two ends 306a-b of the conveyor belt 302 can create multiple regions for each of the two ends 306a-b. For instance, by placing the securing bracket 318b on top of the two ends 306a-b, the forming tool 304 can create multiple initial welding regions 310a-n and multiple apertures surrounding regions 312a-n. The forming tool 304 can then weld some of the regions and then weld the other regions, e.g., as part of a stitch welding process of the two ends 306a-b. For instance, the forming tool 304 can position a heating device on top of the two ends 306a-b to weld the regions together.

Each of the aperture surrounding regions 312a-n can surround and be adjacent to an aperture included in the corresponding end 306a-b of the conveyor belt 302. For example, a first aperture surrounding region 312a can surround and be adjacent to a first aperture through which a first pin 316a passes.

The multiple initial welding regions 310a-n can be between sequential aperture surrounding regions 312a-n. For instance, a first initial welding region 310b can be between the first aperture surrounding region 312a and a second aperture surrounding region 312b.

The multiple initial welding regions 310a-n can include one or more additional regions that are not between sequential apertures surrounding regions 312a-n. For example, the multiple initial welding regions 310a-n can include an end initial welding region 310a that is positioned along a first longitudinal edge of the conveyor belt 302.

While the two rows of apertures 308a-b are aligned, e.g., on the guide 318a, the forming tool 304 welds at least some regions of the two ends 306a-b together. For instance, the forming tool 304 can weld corresponding initial welding regions 310a-n together with a heating device positioned on top of the initial welding regions 310a-n formed by the securing bracket 318b. When the conveyor belt 302, and the two ends 306a-b, are manufactured of Teflon, e.g., with fiberglass, the forming tool can heat the initial welding regions 310a-n to a temperature between 450 and 475° F. to connect the corresponding initial welding regions 310a-n from the two ends 306a-b of the conveyor belt 302.

The two ends 306a-b can be welded together using any appropriate material. For instance, the welding process can include welding the two ends 306a-b together with the use of an adhesive between at least portions of the two ends 306a-b. The portions between which the adhesive is located can include portions of the two ends 306a-b other than the rows of apertures 308a-b. The adhesive can be a Teflon tape. The adhesive can have a thickness of 3.5 mils. In some implementations, the welding process can use the adhesive when a thickness of the two ends does not satisfy a thickness threshold, e.g., is less than a thickness threshold. In some examples, the welding process does not include the use of any adhesive and only includes the heating process of the two ends 306a-b.

The forming tool 304 can weld the initial welding regions 310a-n for any appropriate period of time. A configuration system can determine a duration for the period of time using the material from which the conveyor belt 302 is manufactured, a thickness of the ends 306a-b, a size of the initial welding regions 310a-n, or a combination of two or more of these.

In some implementations, the securing bracket 318b can have a weight selected to increase a likelihood that the ends 306a-b are flat while positioned on top of the guide 318a. By increasing a likelihood that the ends 306a-b are flat, the securing bracket 318b can reduce a likelihood that the two ends, when connected, do not have any wrinkles, increase a processing throughput, speed, or both, of the continuous conveyor, or a combination of these.

After welding the initial welding regions 310a-n, the forming tool 304 can remove the alignment subcomponent 318 from the conveyor belt 302 and place the ends 306a-b on top of the welding platform 320, as shown in FIG. 3C. For example, the forming tool 304 can retract the pins 316a-b from the apertures 308a-b, remove the guide 318a from behind the conveyor belt 302, and remove the securing bracket 318b from on top of the conveyor belt 302. The forming tool 304 can place the ends 306a-b on top of the welding platform 320 by moving the welding platform 320 to a position behind the ends 306a-b. The position behind the ends 306a-b can be substantially the same position in which the forming tool 304 positioned the guide 318a.

The forming tool 304 can weld the ends 306a-b of the conveyor belt 302 together, e.g., by placing a heating device on top of the ends 306a-b. The heating device can heat the ends 306a-b to a temperature between 450 and 475° F.

The heating device can weld any appropriate corresponding regions from the two ends 306a-b together. In some examples, the heating device welds only corresponding aperture surrounding regions 312a-n from the two ends 306a-b together. In some implementations, the heating device welds corresponding aperture surrounding regions 312a-n from the two ends 306a-b together while completing a welding process for the initial welding regions 310a-n.

Figure 4A:
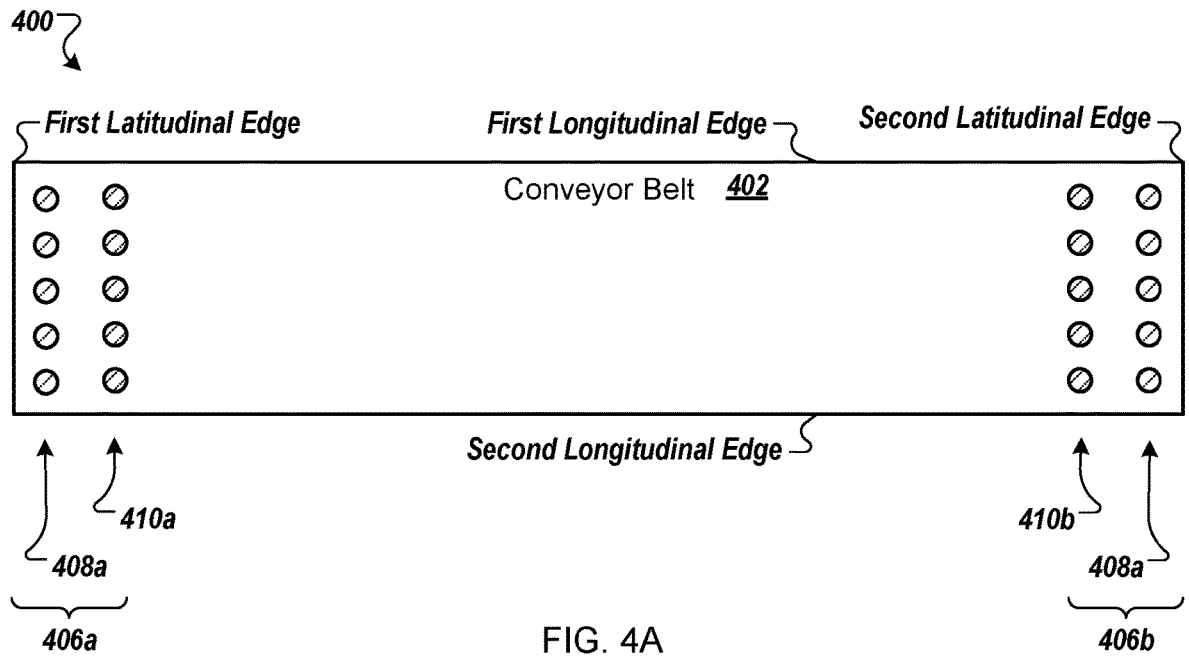
FIGS. 4A-E depict an example environment with a conveyor belt that initially has two rows of apertures and on each end.
Figure 4B:
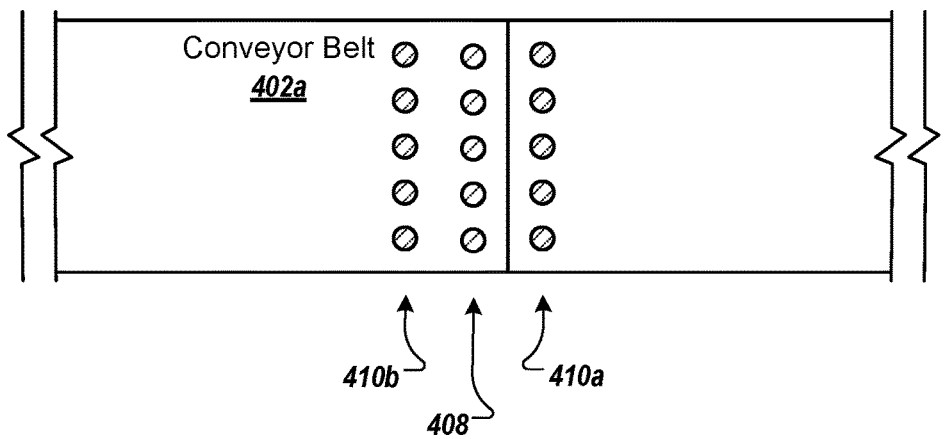
Figure 4C:
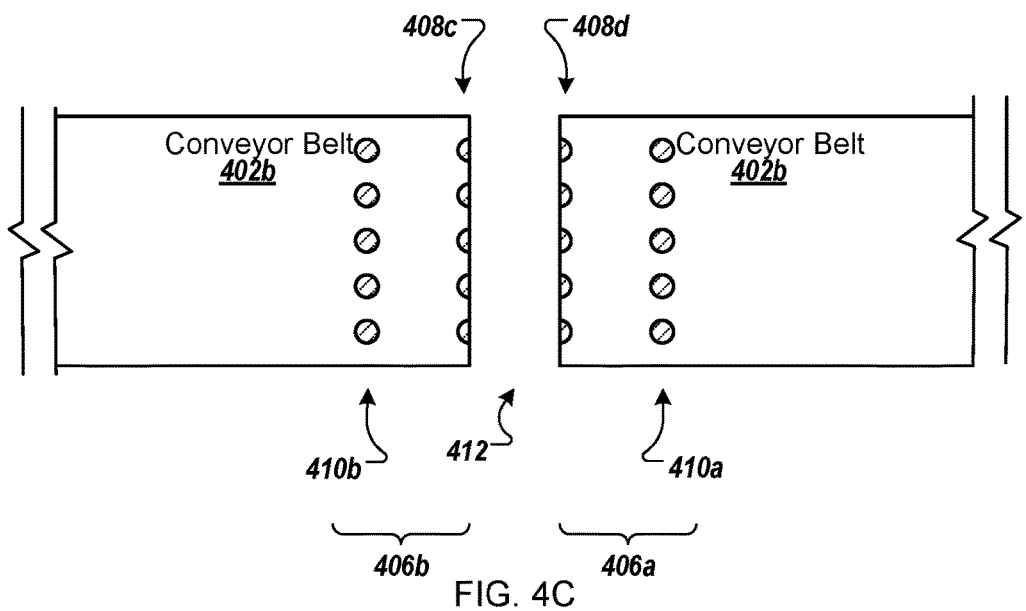
Figure 4D:
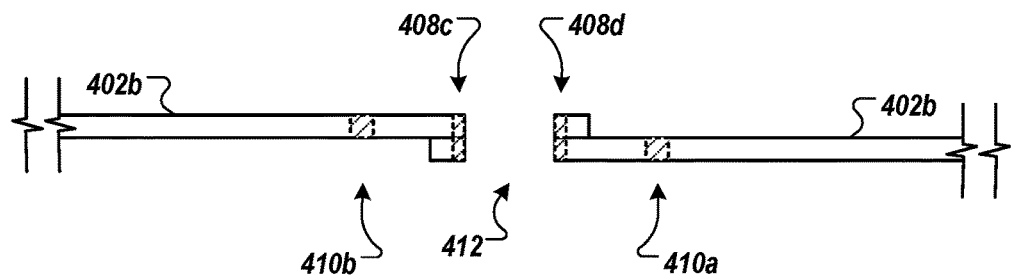
Figure 4E:
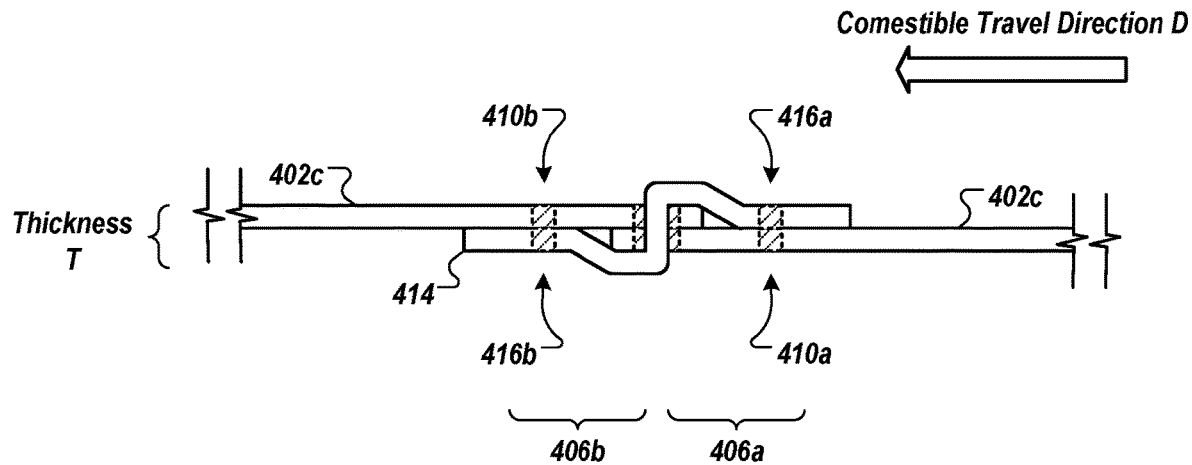

FIGS. 4A-E depict an example environment 400 with a conveyor belt 402 that initially has two rows of apertures 408a-b and 410a-b on each end 406a-b. A comestible processing system can use the second rows of apertures 410a-b in the conveyor belt 402 to form a rejoined belt after the conveyor belt 402 is removed from the comestible processing system. FIGS. 4A-C depict a plan view of the conveyor belt 402 at different times, while FIGS. 4D-E depict an elevation view of the conveyor belt 402 at different times.

For example, the environment 400 can be the environment 300, with the conveyor belt 402 being a version of the conveyor belt 302 with second rows of apertures 410a-b at each end 406a-b. A comestible processing system, e.g., a comestible press, can use the conveyor belt 402, depicted in FIG. 4A, to initially form a continuous conveyor belt 402a, depicted in FIG. 4B, similar to the process described above with reference to FIG. 3.

As the continuous conveyor belt 402a is used to convey comestibles, the continuous conveyor belt 402a can get dirty. For instance, dough or other particles from comestibles transported by the continuous conveyor belt 402a can stick to the continuous conveyor belt 402a.

To clean the continuous conveyor belt 402a, the continuous conveyor belt 402a might need to be removed from the comestible processing system, e.g., from the comestible press. To remove the continuous conveyor belt 402a, the comestible processing system can cut the continuous conveyor belt 402a, forming a cut conveyor belt 402b with a cut 412 between the two ends 406a-b of the cut conveyor belt 402b, as depicted in FIGS. 4C-D.

The comestible processing system can form the cut 412 in the continuous conveyor belt 402a approximately in the center of the first rows of apertures 408a-b that are overlapping. For instance, as described in more detail above, to form the continuous conveyor belt 402a, the pair of first rows of apertures 408a-b are placed approximately on top of each other. The two ends of the belt 406a-b are then connected. When the continuous conveyor belt 402a needs to be cleaned, the comestible processing system can form a latitudinal cut 412 in the continuous conveyor belt 402a.

The comestible processing system can use any appropriate process to form the cut 412 in the continuous conveyor belt 402a. The comestible processing system can include a blade used to form the cut 412. In some examples, an external tool, e.g., held by an engineer, can be used to form the latitudinal cut.

FIG. 4D depicts an elevation view of the cut conveyor belt 402b that aligns with the plan view depicted in FIG. 4C. For instance, the second row of apertures 410a-b is depicted with the dashed lines and cross-hatching. The left and right sides of the cut first row of apertures 408c-d is similarly depicted.

After the cut conveyor belt 402b is cut, the cut conveyor belt 402b can be removed from an apparatus in the comestible processing system to which it was attached. For instance, the cut conveyor belt 402b can be removed from a comestible press.

The cut conveyor belt 402b can be cleaned or otherwise processed while the cut conveyor belt 402b is removed from the apparatus to which it was attached. For instance, the cut conveyor belt 402b can be exposed to a food-grade cleaning process to remove the dough and other particles from the cut conveyor belt 402b.

In some examples, since the continuous conveyor belt 402a can get dirty on both sides, e.g., the top side that conveys comestibles and the bottom side that contacts the apparatus, all sides of the cut conveyor belt 402b can be cleaned. The top and bottom sides can be cleaned at least partially concurrently or separately.

Although FIGS. 4B-E depict two separate ends of the conveyor belt 402, those ends would actually be connected. For instance, with the cut 412 in the cut conveyor belt 402b, the other two ends of the cut conveyor belt 402b would actually be connected though this is not shown in the figures.

To rejoin the cut conveyor belt 402b into a rejoined continuous conveyor belt 402c, the comestible processing system can use a splice piece 414 to connect the two ends 406a-b of the conveyor belt, as shown in FIG. 4E. The comestible processing system can place the splice piece 414 between the two ends 406a-b such that the splice piece 414 is below a downstream processing end 406b and above an upstream processing end 406a given a comestible travel direction D.

The splice piece 414 includes two rows of apertures 416a-b. Each of the rows aligns with one of the second rows of apertures 410a-b in the conveyor belt 402. For instance, an upstream row of apertures 416a in the splice piece aligns with an upstream row of apertures in the conveyor belt 402. A downstream row of apertures 416b in the splice piece aligns with a downstream row of apertures 410b in the conveyor belt 402.

The comestible processing system can connect the splice piece 414 with the conveyor belt 402 to form the rejoined continuous conveyor belt 402c. For instance, the comestible processing system can use a process such as that described above for aligning the rows of apertures 408 and connecting the two ends of the conveyor belt 402 to form the continuous conveyor belt 402a to connect, e.g., separately, each of the ends 406a-b to respective portions of the splice piece 414. The comestible processing system can align the upstream rows of apertures 410a and 416a and connect an upstream end of the splice piece 414 with an upstream end 406a of the conveyor belt 402. The comestible processing system can align the downstream rows of apertures 410b and 416b and connect a downstream end of the splice piece 414 with a downstream end 406b of the conveyor belt 402.

The comestible processing system can secure a center portion of the splice piece 414 to the ends 406a-b of the conveyor belt 402. For instance, the comestible processing system can weld the center portion of the splice piece 414 to each of the ends 406a-b of the conveyor belt 402. This can substantially maintain a form of the splice piece 414 with respect to the conveyor belt 402, reduce a likelihood of the ends 406a-b moving away from each other, e.g., if the splice piece 414 were to go flat, or both.

The rejoined conveyor belt 402c has a thickness T where the two ends 406a-b are rejoined. For example, when the continuous conveyor belt 402a is initially formed, a connected portion of the continuous conveyor belt 402a can have a thickness $T_1$ that is substantially similar to an original thickness $T_0$ of the rest of the belt. The original thickness can be an average thickness, a target thickness, or both, to account for manufacturing tolerances. When adding the splice piece 414 to the cut conveyor belt 402b, the splice piece 414 increases a thickness of the rejoined conveyor belt 402c where the two ends 406a-b are rejoined. The thickness T of the rejoined ends can be approximately 50% greater than the thickness $T_1$, the thickness $T_0$, or both.

In some examples, the comestible processing system can remove a portion of the continuous conveyor belt 402a within a threshold distance of the two ends 406a-b that has a thickness that does not satisfy a threshold thickness. The threshold thickness can be a target thickness, e.g., $T_1$. This can include removing a portion of the conveyor belt 402 within a threshold distance of the row of apertures 408, e.g., that is depicted as thicker than other portions of the conveyor belt 402, although the drawings are not necessarily to scale. By forming a cut conveyor belt 402b by removing the portion that has a thickness that does not satisfy the threshold thickness, the comestible processing system can reduce a variance in the thickness of the rejoined conveyor belt 402c which can increase comestible processing uniformity.

In some implementations, a width of the cut 412 can be approximately the same size as a thickness of the splice piece 414. This can increase a likelihood that the continuous conveyor belt 402a and the rejoined continuous conveyor belt 402c are approximately the same length. By having the same length, the conveyor belts 402a, 402c can be more likely to have the same tension on the apparatus in the comestible processing system. This can increase a likelihood of uniform comestible processing before and after the conveyor belt 402 rejoining process.

The splice piece 414 can be manufactured from the same type of material as the conveyor belt 402. For instance, the splice piece can be manufactured from silicon, fiberglass, Teflon, or a combination of these.

In some implementations, the comestible processing system can reduce a thickness of an originally joined portion of the conveyor belt 402 as part of the rejoining process. For example, first portions of the conveyor belt 402 around the first rows of apertures 408a-b can be thinner than the inner portions of the conveyor belt 402. A thickness of the first portions can be selected such that, when connected, the connected first portions have approximately the same thickness as a thickness of the inner portions of the conveyor belt 402.

Since the comestible processing system is adding the splice piece 414 onto the two end 406a-b of the conveyor belt 402, this rejoined portion of the conveyor belt 402 would be thicker than the inner portions of the conveyor belt 402. To reduce, eliminate, or both, the variation in the thicknesses, the comestible processing system can reduce a thickness of the first portions, e.g., by melting at least some of the first portions, other portions of the two ends 406a-b, or a combination of both.

In some implementations, the upstream portion of the splice piece 414 is above the conveyor belt 402 while the downstream portion of the splice piece 414 is below the conveyor belt 402 to reduce friction, to reduce a likelihood that the conveyor belt 402 will stick to other components in the comestible processing system, or a combination of both.

The configuration of the connection of the splice piece 414 and the conveyor belt 402 can be any appropriate configuration. For instance, the downstream portion of the splice piece 414 can be above the downstream portion of the conveyor belt 402 while the upstream portion of the splice piece 414 can be below the upstream portion of the conveyor belt 402. This can cause the downstream portion to be slightly above the upstream portion, reducing a likelihood that the rejoined portion of the rejoined conveyor belt 402 will stick to other components in the comestible processing system. In some examples, the splice piece 414 can be entirely above or entirely below the conveyor belt 402.

In some implementations, the conveyor belt 402 does not support comestibles at positions above the rows of apertures 408*a-b*, 410*a-b*. For instance, when processing comestibles on a potentially non-uniform surface of the conveyor belt 402 might result in different properties for the comestibles, the conveyor belt 402 might not support comestibles at positions above the rows of apertures 408*a-b*, 410*a-b*. This can occur when the conveyor belt 402 is included in a comestible press, e.g., as compared to an oven or a cooler.

Figure 5:
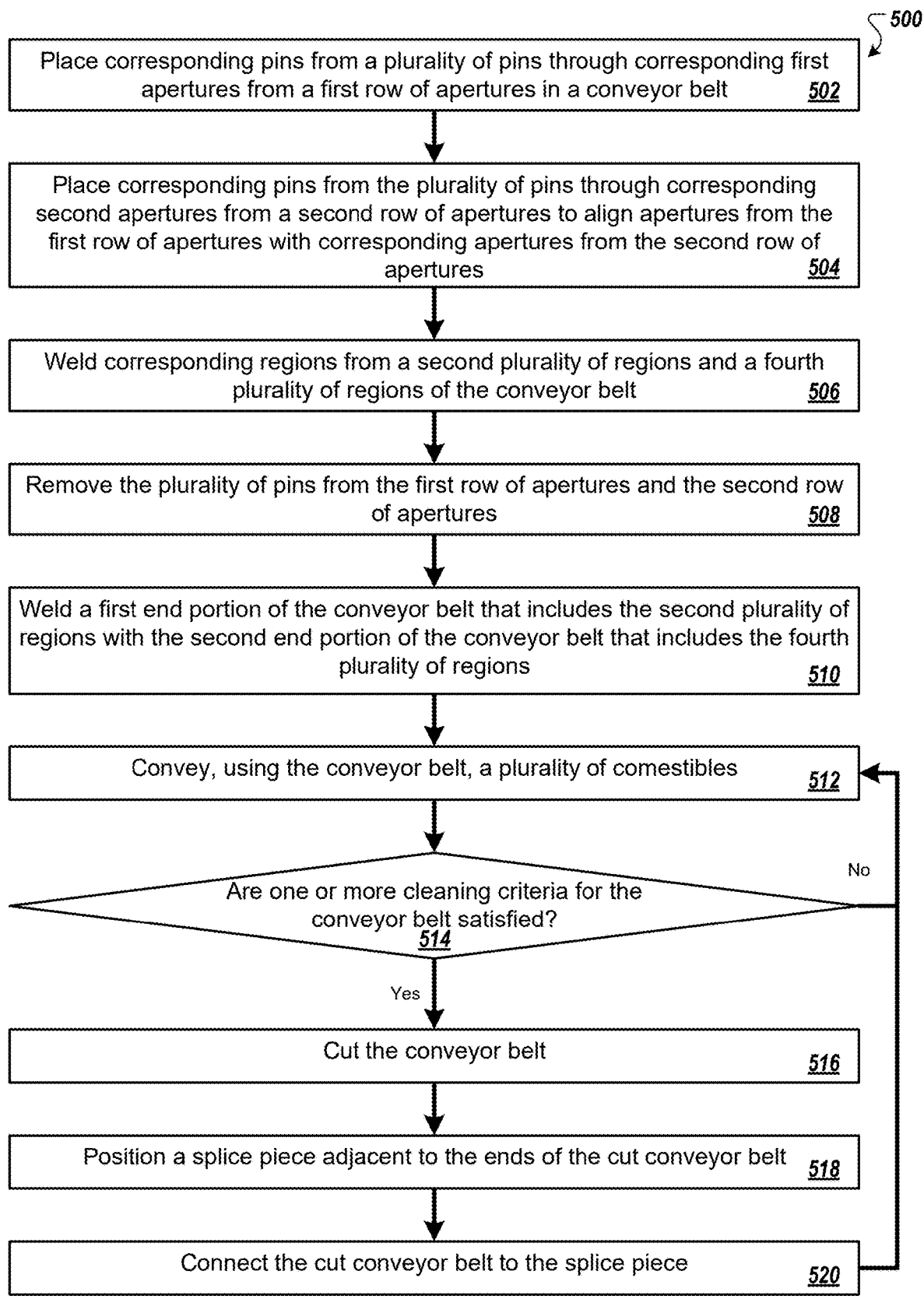
FIG. 5 is a flow diagram of an example process for forming a continuous conveyor belt.

FIG. 5 is a flow diagram of an example process 500 for forming a continuous conveyor belt, e.g., the conveyor belt 102, 202, or 302. For example, the process 500 can be used by a comestible processing system, e.g., the forming tool 304 from the environment 300, a comestible press, another apparatus in the comestible processing system, or a combination of two or more of these.

A forming tool places corresponding pins from a plurality of pins through corresponding first apertures from a first row of apertures in a conveyor belt (502). For example, the forming tool can move a guide that includes the pins from a retracted position to an extended position, placing the pins through the first apertures. The forming tool can perform this operation while the conveyor belt is positioned on a component in a comestible processing system, e.g., a comestible press.

The conveyor belt has a first end portion and a second end portion. The end portions can be latitudinal end portions. The first end portion can include a) the first row of apertures, b) a first plurality of regions that each surround a corresponding aperture from the first row of apertures, and c) a second plurality of regions between sequential regions from the first plurality of regions. The second end portion can include a) the second row of apertures, b) a third plurality of regions that each surround a corresponding aperture from the second row of apertures, and c) a fourth plurality of regions between sequential regions from the third plurality of regions.

The forming tool places corresponding pins from the plurality of pins through corresponding second apertures from a second row of apertures to align apertures from the first row of apertures with corresponding apertures from the second row of apertures (504). For instance, the forming tool can move the guide that includes the pins from the retracted position to the extended position, placing the pins through the second apertures. In some examples, when moving the guide from the retraced to the extended position, the forming tool can place the pins through the first apertures and the second apertures, e.g., as part of the same movement.

The forming tool can place a securing bracket onto the ends of the conveyor belt after placing the pins through the corresponding apertures. By placing the securing bracket onto the ends of the conveyor belt, the forming tool can define the regions using the securing bracket.

The forming tool welds corresponding regions from a second plurality of regions and a fourth plurality of regions of the conveyor belt (506). The forming tool can weld the second and fourth regions using any appropriate temperature and pressure. The temperature can be between 400 to 1000° F., preferably between 500 to 780° F., preferably between 750 to 780° F.

The forming tool can apply the temperature to the second plurality of regions and the fourth plurality of regions for any appropriate processing time. For instance, the forming tool can apply the temperature for between five to 40 seconds, preferably between five to ten seconds.

The forming tool can apply at least three pounds of pressure per square inch to the conveyor belt. For instance, the forming tool can apply between three and 50 pounds of pressure per square inch to the conveyor belt, preferably between three and 30 pounds of pressure per square inch or eight pounds of pressure per square inch.

For forming tool can use one or more irons to weld the corresponding regions. For instance, the forming tool can place one or more welding tools above the corresponding regions, contact the irons with one of the regions from a pair of corresponding regions, and weld the pair of corresponding regions together. The forming tool can use a single iron that is moved from one region to another to weld the corresponding second and fourth regions. The forming tool can use multiple irons, e.g., two or more irons. In some examples, the forming tool can use one iron per pair of second and fourth regions.

The forming tool removes the plurality of pins from the first row of apertures and the second row of apertures (508). For instance, the forming tool can remove the securing bracket from on top of the rows of apertures. The forming tool can retract the guide that includes the pins to remove the pins from the apertures.

The forming tool can position a welding platform behind the end portions of the conveyor belt. For example, after removing the pins from the apertures, the forming tool can place the welding platform behind the ends of the conveyor belt, which ends include the first, second, third, and fourth regions.

The welding platform can have a substantially flat surface. The substantially flat surface can reduce a likelihood that the ends of the conveyor belt will have wrinkles after the welding process.

The forming tool welds a first end portion of the conveyor belt that includes the second plurality of regions with the second end portion of the conveyor belt that includes the fourth plurality of regions (510). For instance, the forming tool can maintain the alignment of the first row of apertures and the second row of apertures with a forming tool while welding the first end portion of the conveyor belt with the second end portion of the conveyor belt. The forming tool can maintain the alignment by holding the conveyor belt in place given the initial welding of the corresponding regions from the second and fourth regions.

The forming tool can weld the first end portion and the second end portion using any appropriate temperature and pressure. The temperature can be between 400 to 1000° F., preferably between 500 to 780° F., preferably between 760 to 780° F. The temperature can be the same or a different temperature as the temperature used in operation 506.

The forming tool can weld the first end portion and the second end portion by welding any appropriate corresponding regions. For instance, the forming tool can weld corresponding regions from the first regions and the third regions. The forming tool can weld corresponding regions from the first regions and the third regions and also weld corresponding regions from the second regions and the fourth regions.

The forming tool can weld the first end portion and the second end portion by placing one or more irons on the first end portion and the second end portion, e.g., on an area that includes the overlap between the first end portion and the second end portion. The forming tool can position the iron toward a center of the area and move the iron toward a longitudinal edge of the area to weld the two end portions. After reaching the longitudinal edge, the forming tool can position the iron toward the center of the area and move the iron toward the other longitudinal edge. In some examples, when the forming tool uses two irons, the forming tool can position a first iron toward the center of the area, begin moving the first iron toward the longitudinal edge, position a second iron toward the center of the area, and then begin moving the second iron toward the other longitudinal edge. By moving an iron from the center of the area toward the longitudinal edges, the forming tool can reduce a likelihood of wrinkles forming in the area of the conveyor belt.

A time used to weld the two ends together can be selected using a width of the belt, thicknesses of the two ends, a material used to manufacture the two ends, or a combination of these. For instance, the time used to weld the two ends together can be between 1 to 30 minutes, preferably between 2 to 10 minutes.

The forming tool can apply at least three pounds of pressure per square inch to the conveyor belt. For instance, the forming tool can apply between three and 50 pounds of pressure per square inch to the conveyor belt, preferably between three and 30 pounds of pressure per square inch or eight pounds of pressure per square inch. The pressure used in operation 510 can be the same as or different than the pressure used during operation 506.

A system conveys, using the conveyor belt, a plurality of comestibles (512). For example, when the forming tool welds the ends of the conveyor belt while the conveyor belt is in a component of the system, e.g., in a comestible press, the system can use the conveyor belt to convey comestibles through the component, e.g., through the comestible press.

In some implementations, the comestible processing system can determine whether to remove the conveyor belt from the component, e.g., the comestible press. For instance, the comestible processing system can determine whether one or more cleaning criteria for the conveyor belt are satisfied (514). The one or more cleaning criteria can indicate an amount of food particles on the conveyor belt or other appropriate criteria for when the conveyor belt should be cleaned. One or more computers included in the comestible processing system can determine whether the one or more cleaning criteria are satisfied, e.g., using data from a camera that captures images of the conveyor belt. The images can be of an upper surface of the conveyor belt, a lower surface of the conveyor belt, or a combination of both.

In some examples, the comestible processing system can determine whether the conveyor belt has reached an end of life and cannot be cleaned. For instance, although only the first row of apertures was used to connect the two ends of the conveyor belt, and the conveyor belt was not rejoined, the comestible processing system can determine whether the conveyor belt should be removed from the component and no longer used, e.g., discarded.

In response to determining that none of the one or more cleaning criteria are satisfied, the comestible processing system can continue to use the conveyor belt to transport comestibles. For instance, the process 500 can proceed to operation 512.

The comestible processing system cuts the conveyor belt (516). The comestible processing system can cut the conveyor belt in response to determining that at least one of the one or more cleaning criteria are satisfied. The comestible processing system can use any appropriate process to cut the conveyor belt. For example, the comestible processing system can use a blade to cut the conveyor belt in a direction traverse to the direction in which comestibles are transported by the conveyor belt.

The comestible processing system can remove the conveyor belt from the component to which the conveyor belt was previously attached. The comestible processing system, or another system, can clean the conveyor belt. When the one or more cleaning criteria are no longer satisfied, e.g., when the conveyor belt is clean, the comestible processing system can position the cut conveyor belt onto a component in the comestible processing system. The component can be the same component from which the cut conveyor belt was removed, e.g., the comestible press, or another component.

The comestible processing system positions a splice piece adjacent to the ends of the cut conveyor belt (518). For instance, the comestible processing system can position one portion of the splice piece above an end of the cut conveyor belt and another portion of the splice piece below another end of the cut conveyor belt. This can increase a likelihood that the rejoined continuous conveyor belt has approximately the same length as the original continuous conveyor belt, e.g., when material is removed from the continuous conveyor belt during the cutting process. The comestible processing system can position the splice piece above both ends of the conveyor belt, e.g., outside the conveyor belt when the belt forms a continuous piece. The comestible processing system can position the splice piece below both ends of the conveyor belt, e.g., inside the conveyor belt when the belt forms a continuous piece. Positioning entirely above or below the belt can be advantageous when no material is removed from the continuous conveyor belt during the cutting process, e.g., so that the length of the rejoined continuous conveyor belt is approximately the same as the length of the original continuous conveyor belt.

The comestible processing system, e.g., the forming tool, connects the cut conveyor belt to the splice piece (520). For instance, the forming tool can perform one or more of operations 502 through 510 to connect the downstream end of the conveyor belt to the downstream end of the splice piece, to connect the upstream end of the conveyor belt to the upstream end of the splice piece, or a combination of both. The connecting process can occur on the component, e.g., comestible press.

After connecting the ends of the cut conveyor belt, the comestible processing system can use the rejoined conveyor belt to convey additional comestibles. For instance, the process 500 can proceed to operation 512.

In some implementations, after rejoining the end of the conveyor belt, when the comestible processing system determines that the one or more cleaning criteria are satisfied, the comestible processing system can determine to discard the rejoined conveyor belt. Since the conveyor belt was already rejoined once using the second rows of apertures, the comestible processing system can determine that when the conveyor belt should be cleaned, the conveyor belt reached its end of life.

In some implementations, the process 500 can include additional operations, fewer operations, or some of the operations can be divided into multiple operations. For example, the forming tool can align the first apertures and the second apertures as a single operation instead of performing operations 502 and 504. In some examples, the process 500 does not include conveying the plurality of comestibles. For instance, the process 500 can include aligning the first apertures and the second apertures, welding corresponding regions from the second and fourth pluralities of regions, and welding the first and second end portions without the other operations in the process 500.

The order of operations in the process 500 described above is illustrative only, and the forming of the continuous conveyor belt can be performed in different orders. For example, the process 500 need not remove the pins from the apertures before operation 510, e.g., when the forming tool performs both welding processes using the guide as the welding support.

A number of implementations have been described. Nevertheless, it will be understood that various modifications may be made without departing from the spirit and scope of the disclosure. For example, various forms of the flows shown above may be used, with operations re-ordered, added, or removed.

Figure 6:
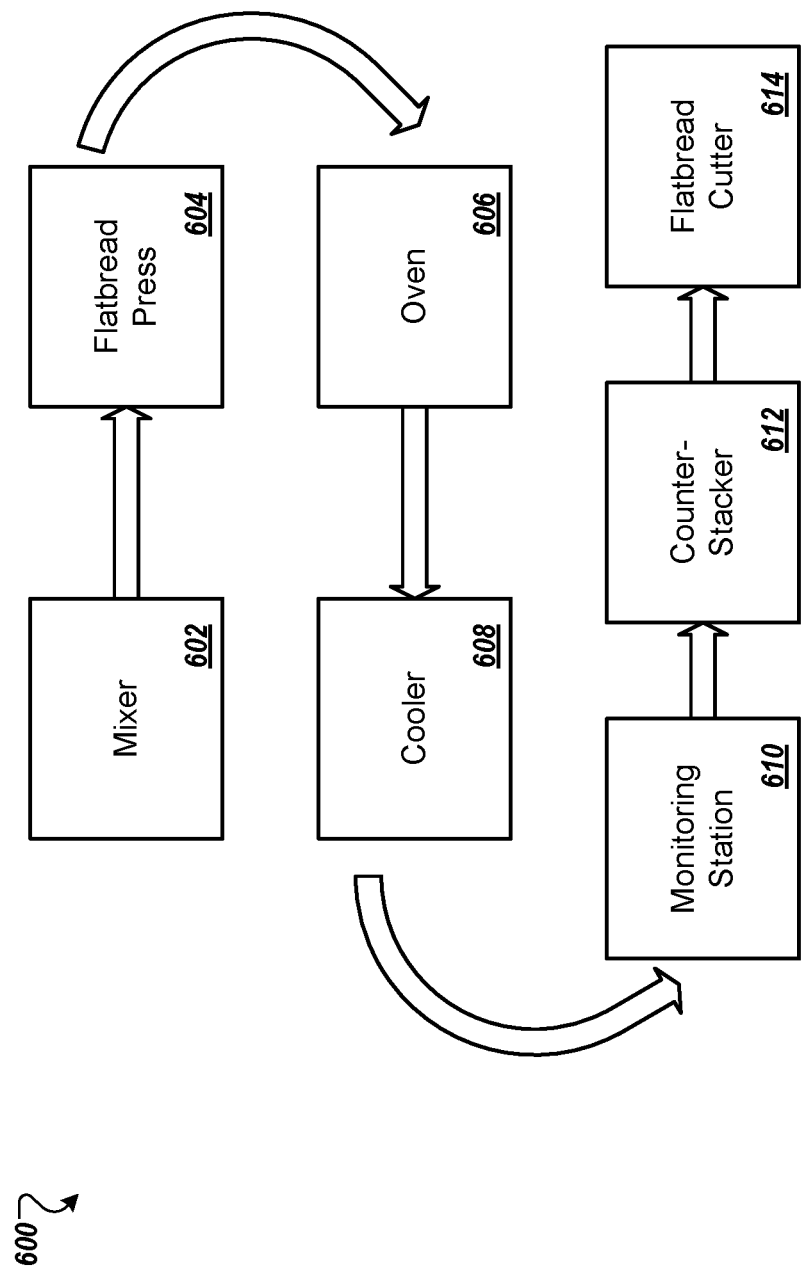
FIG. 6 depicts an example of some devices that can be included in a flatbread processing system.

FIG. 6 depicts an example of some devices that can be included in a flatbread processing system 600, e.g., a comestible processing system. The flatbread processing system 600 can be used to process the comestibles described above with reference to FIGS. 1, 2, 3A-C, and 4A-E. The flatbread processing system 600 does not depict all devices that could be included in a system, depending on system configuration, such as a dough ball loader that forms balls of dough from batter created by a mixer 602 and places the dough balls on the flatbread press 604, e.g., a forming press, using a comestible loader.

The flatbread processing system 600 includes a mixer 602. The mixer 602 combines multiple ingredients according to a process recipe. The mixer 602 mixes the multiple ingredients to create a dough batter.

The mixer 602 can be connected to a former (not shown) that creates dough balls from the batter created by the mixer 602. The former can place the dough balls in a dough ball loader that is configured according to a pressing pattern layout for the flatbread being made by the flatbread processing system 600. The former selects an amount of batter based on a threshold comestible size range for the dough balls, e.g., to create 10 inch tortillas or 8 inch tortillas. The threshold comestible size range can be a comestible parameter, e.g., specified by the process recipe.

The dough ball loader can place the dough balls on a conveyer included in the flatbread press 604. Once a dough ball is placed on a location on an upper surface of the conveyor for each of the locations in a pressing pattern layout, e.g., a 3×3 pressing pattern layout, the flatbread press 604 moves the conveyor forward to place the dough balls under the press. The flatbread press 604 then presses the dough balls. During the pressing operation, the flatbread press 604 can slightly bake the dough balls to increase a likelihood that the pressed dough balls will maintain their pressed shape.

The flatbread press 604 can then transfer the pressed dough balls to a discharge station included in the flatbread press 604. The discharge station can include a heater to parbake the pressed dough balls. Use of the discharge station can enable the flatbread press 604 to use a lower temperature during the pressing process.

The flatbread processing system 600 then transfers the pressed dough balls from the flatbread press 604 to an oven 606. The flatbread processing system 600 can use one or more conveyors to transfers the dough balls from the flatbread press 604 to the oven 606.

The oven 606 includes one or more oven conveyors that transfer the pressed dough balls through the oven 606 during a cooking process. As the one or more conveyors transfer the pressed dough balls through the oven 606, the pressed dough balls are cooked so that when the pressed dough balls exit the oven 606, the cooking process is likely complete. In some implementations, the pressed dough balls can proceed to another cooking process after removal from the oven 606.

After cooking, the flatbread processing system 600 can transfer the cooked, pressed dough balls onto one or more conveyors to transfer the pressed dough balls from the oven 606 to a cooler 608. In some implementations, the flatbread processing system 600 can use one or more conveyors that transfer the pressed dough balls to an upper portion of the cooler 608.

The cooler 608 can include multiple cooling conveyors that transport the pressed dough balls through the cooler 608. The cooler 608 can use any appropriate process, components, or both, to reduce the temperature of the pressed dough balls. For instance, as the pressed dough balls move through the cooler 608, air can move across the surfaces of the pressed dough balls to cool the pressed dough balls to a reduced temperature.

In some examples, the pressed dough balls can have a temperature close to 200° F. when entering the cooler 608. The cooler can include one or more fans to move air from an environment outside of the cooler 608 (e.g., at an ambient temperature between about 65 to about 80° F.) across the cooling conveyors and the pressed dough balls. As the air passes across the pressed dough balls, heat is removed from the pressed dough balls and the pressed dough balls are cooled.

The flatbread processing system 600 transfers the pressed dough balls from the cooler to a monitoring station 610. The monitoring station 610 can analyze one or more properties of the pressed dough balls, including the diameter and color. For instance, the monitoring station 610 can determine whether a pressed dough ball was burnt, conforms with size requirements for a process recipe for the pressing pattern, or both. In general, the monitoring station 610 can determine whether the pressed dough ball substantially conforms with one or more threshold comestible parameters for the process recipe.

The monitoring station 610 can include a dough ball removal device used to remove dough balls from the monitoring station 610 that do not conform to predetermined criteria for the recipe. For instance, the monitoring station can include one or more air blowers, e.g., one for each processing lane for the pressing pattern, to remove pressed dough balls that were overcooked, pressed too much, not pressed enough, or a combination of these.

The flatbread processing system 600 transfers the pressed dough balls that conform to the predetermined criteria to a counter-stacker 612. The counter-stacker 612 can create stacks of pressed dough balls based on a stack quantity identified in the recipe for the flatbread processing system 600.

The flatbread processing system 600 transfers stacks of pressed dough balls to a bagger 614 that places each stack into a bag. The bagged stack of pressed dough balls can then be removed from the bagger 614 and the flatbread processing system 600.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the operations recited in the claims, described in the specification, or depicted in the figures can be performed in a different order and still achieve desirable results. In some cases, multitasking and parallel processing may be advantageous.

What is claimed is:

1. A system comprising:
a conveyor belt adapted to move a plurality of comestibles and having i) a first edge, ii) a second edge opposite the first edge, iii) a first row of apertures that is substantially parallel to the first edge, and iv) a second row of apertures that is substantially parallel to the second edge, wherein:
the conveyer belt comprises opposing aperture row pairs on opposite sides of the conveyer belt and that comprise the first row and the second row of apertures, and
at least one opposing aperture row pair including the first row of apertures and the second row of apertures are configured to accommodate a forming tool to align the first edge with respect to the second edge during a welding process.

2. The system of claim 1, wherein the conveyor belt comprises:
a third row of apertures that is a) substantially parallel to the first edge, and b) within a threshold distance from the first row of apertures; and
a fourth row of apertures that is a) substantially parallel to the second edge, and b) within the threshold distance from the second row of apertures.

3. The system of claim 2, comprising:
a splice piece having a first end and a second end, wherein:
a first threshold portion of a first end adjacent to the first edge overlaps and is welded to the first end of the splice piece;
a second threshold portion of a second end adjacent to the second edge overlaps and is welded to the second end of the splice piece; and
the first threshold portion is substantially the same size as the second threshold portion.

4. The system of claim 1, wherein the first row of apertures is a threshold distance from the first edge and the second row of apertures is the threshold distance from the second edge.

5. The system of claim 1, wherein:
a first threshold portion of a first end adjacent to the first edge overlaps and is welded to a second threshold portion of a second end adjacent to the second edge;
the first threshold portion is substantially the same size as the second threshold portion and is between ¼ inches and 4 inches; and
a first threshold portion of a first end adjacent to the first edge overlaps and is attached to a second threshold portion of a second end adjacent to the second edge with a heating process between 400 to 1000° F.

6. The system of claim 1, wherein the conveyor belt comprises an outer surface adapted to support the plurality of comestibles on portions of the outer surface other than a threshold portion of a first end adjacent to the first edge and the threshold portion of a second end adjacent to the second edge.

7. The system of claim 6, comprising:
a support frame connected to and supporting the conveyor belt; and
a press that processes the plurality of comestibles while the plurality of comestibles are on the portions of the outer surface other than the threshold portion of the first end adjacent to the first edge and the threshold portion of the second end adjacent to the second edge.

8. The system of claim 7, comprising:
a loader connected to the support frame and adapted to place the plurality of comestibles on the outer surface of the conveyor belt; and
a second conveyor belt adapted to receive at least some of the plurality of comestibles from the conveyor belt after the conveyor belt receives the plurality of comestibles from the loader and moves the at least some of the plurality of comestibles in a longitudinal direction.

9. The system of claim 8, comprising:
a wire connected to the support frame at an end of the support frame within a threshold distance from the second conveyor belt and adapted to remove comestibles from the second conveyor belt for transport onto the second conveyor belt.

10. The system of claim 9, wherein the wire is adapted to remove comestibles from the second conveyor belt for transport onto the second conveyor belt without damaging comestibles.

11. The system of claim 1, comprising:
a support frame connected to and supporting the conveyor belt; and
a wire connected to the support frame and adapted to remove comestibles from the conveyor belt.

12. The system of claim 11, wherein the wire is between 2/1000 of an inch and ½ inch from the conveyor belt, and the conveyer belt has at least one of a width of at least fifty-two inches or a thickness between 2 and 20 mils.

13. A method comprising:
aligning a first row of apertures at a first end of a conveyor belt with a second row of apertures at a second end of the conveyor belt using a forming tool configured to retain the first row of apertures and the second row of apertures during a welding process, the conveyor belt comprising
i) a first end portion that includes a) the first row of apertures at the first end of the conveyor belt, b) a first plurality of regions that each surround a corresponding aperture from the first row of apertures, and c) a second plurality of regions between sequential regions from the first plurality of regions, and ii) a second end portion that includes a) the second row of apertures at the second end of the conveyer belt, b) a third plurality of regions that each surround a corresponding aperture from the second row of apertures, and c) a fourth plurality of regions between sequential regions from the third plurality of regions;

welding, while the first row of apertures and the second row of apertures are retained by the forming tool, corresponding regions from the second plurality of regions and the fourth plurality of regions; and welding the first end portion of the conveyor belt with the second end portion of the conveyor belt.

14. The method of claim 13, wherein welding the first end portion of the conveyor belt with the second end portion of the conveyor belt comprises (i) welding corresponding regions from the first plurality of regions and the third plurality of regions and (i) welding corresponding regions from the second plurality of regions and the fourth plurality of regions.

15. The method of claim 13, wherein welding the first end portion of the conveyor belt with the second end portion of the conveyor belt comprises (i) welding corresponding regions from the first plurality of regions and the third plurality of regions and (i) substantially maintaining the weld between the corresponding regions from the second plurality of regions and the fourth plurality of regions.

16. The method of claim 13, wherein aligning the first row of apertures and the second row of apertures comprises:

placing corresponding pins from a plurality of pins through corresponding first apertures from the first row of apertures; and placing the corresponding pins from the plurality of pins through corresponding second apertures from the second row of apertures to align apertures from the first row of apertures with corresponding apertures from the second row of apertures.

17. The method of claim 16, comprising:

removing the plurality of pins from the first row of apertures and the second row of apertures after welding corresponding regions from the first plurality of regions and the second plurality of regions; and after removing the plurality of pins from the first row of apertures and the second row of apertures, maintaining the alignment of the first row of apertures and the second row of apertures with the forming tool while welding the first end portion of the conveyor belt with the second end portion of the conveyor belt.

18. The method of claim 13, comprising:

cutting the conveyor belt through the first row of apertures and the second row of apertures;

aligning a third row of apertures at the first end of the conveyor belt with a fourth row of apertures at a first end of a splice piece adjacent to the conveyor belt, the conveyor belt and the splice piece comprising a fifth plurality of regions that each surround corresponding pairs of apertures from the third row of apertures and the fourth row of apertures and a sixth plurality of regions that are each between sequential regions from the fifth plurality of regions;

aligning a fifth row of apertures at the second end of the conveyor belt with a sixth row of apertures at a second end of the splice piece, the conveyor belt and the splice piece comprising a seventh plurality of regions that each surround corresponding pairs of apertures from the fifth row of apertures and the sixth row of apertures and an eighth plurality of regions that are each between sequential regions from the seventh plurality of regions;

welding corresponding regions from the sixth plurality of regions in the first ends of the conveyor belt and the splice piece; and welding corresponding regions from the eighth plurality of regions in the second ends of the conveyor belt and the splice piece.

19. The method of claim 18, comprising positioning the splice piece adjacent to the first end and the second end of the conveyor belt.

20. The method of claim 13, wherein the conveyer belt comprises only the first row of apertures and the second row of apertures.

* * * * *